Aug. 8, 1950 W. KEISTER 2,518,022

TRANSLATOR

Filed Sept. 30, 1948 4 Sheets-Sheet 1

INVENTOR
W. KEISTER
BY John A. Hall
ATTORNEY

Aug. 8, 1950 W. KEISTER 2,518,022

TRANSLATOR

Filed Sept. 30, 1948 4 Sheets-Sheet 2

INVENTOR
W. KEISTER
BY John A. Hall
ATTORNEY

Aug. 8, 1950 W. KEISTER 2,518,022

TRANSLATOR

Filed Sept. 30, 1948 4 Sheets-Sheet 3

INVENTOR
W. KEISTER
BY John A. Hall
ATTORNEY

Aug. 8, 1950 W. KEISTER 2,518,022

TRANSLATOR

Filed Sept. 30, 1948 4 Sheets-Sheet 4

INVENTOR
W. KEISTER
BY John A. Hall
ATTORNEY

Patented Aug. 8, 1950 2,518,022

UNITED STATES PATENT OFFICE 2,518,022

TRANSLATOR

William Keister, Short Hills, N. J., assignor to Bell Telephone Laboratories, Incorporated, New York, N. Y., a corporation of New York Application September 30, 1948, Serial No. 51,935

4 Claims. (Cl. 177—380)

This invention relates to communication systems and particularly to means for translating numbered identification of lines into numbered identification of apparatus to which said lines may be connected.

The object of the invention is to provide simple, quick-acting and economical means for translating one number into another such as a four-digit line number into a four-digit equipment number for the location of equipment to which the said line may be connected.

In its broad aspects the present invention provides a means to convert signals on a particular group out of a plurality of incoming conductors to signals on another particular group out of a plurality of outgoing conductors where each of the incoming conductors and each of the outgoing conductors is multipled to a plurality of said converting means.

In accordance with the present invention use is made of a saturable reactor or "kick coil." This piece of apparatus is similar to a transformer having a plurality of windings which are wound on a core and are arranged so that current flowing through any one or more of the windings will saturate the core. The basic element of the system consists of such a saturable reactor having as many primary windings as there are digits in the number to be translated and as many secondary windings as there are digits in the number into which the first number is to be translated. These reactors will be provided on the basis of one-per-code combination or line number to be translated. When the translator is in use each reactor will have a number of windings energized by direct current, the current through a single winding being sufficient to saturate the core. The basic translator action is to remove the energizing current from certain windings on a group of reactors cross-connected in such a manner that a particular input code combination will permit current to flow through at least one winding of all reactors except the one representing that code combination. This particular reactor having all energized windings deenergized will produce a voltage "kick" which will actuate gas or vacuum tube detectors appropriately cross-connected to a set of windings on the reactors designated as output windings. The translation is indicated by the particular set of output detectors which are actuated.

In one form of the invention all of the windings on these reactors which must respond to the signal on a particular conductor are connected in multiple.

In another form of the invention such coils are connected in series. Each form has certain practical advantages and disadvantages but each form is operative.

A feature of the invention may, therefore, be stated to be a converting means individual to an incoming number to be converted and responsive only to the simultaneous occurrence of the signals on each of the incoming conductors by which such incoming number is known.

Another feature of the invention is a means for locking a reactor out of service by providing an additional coil thereon which may be connected to a source of current so that the operation of the reactor will depend not only on the simultaneous signals on each of the incoming coils but also on the control exercised through such additional coil.

Other features will appear hereinafter.

The drawings consist of four sheets having six figures as follows.

Figure 5:
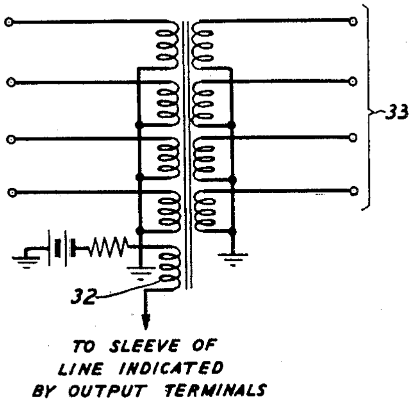
Figure 6:
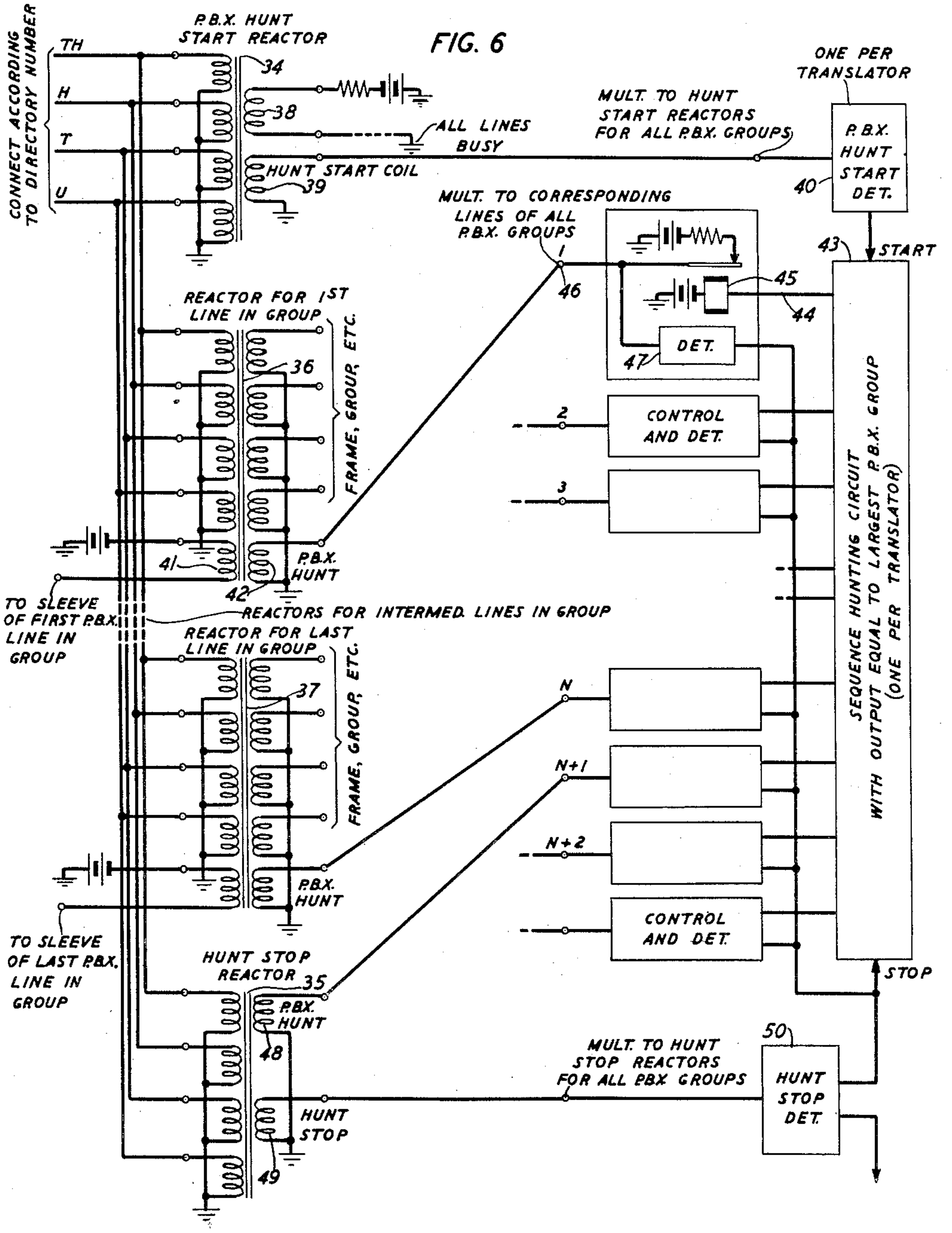

Fig. 5 is a fragmentary circuit arrangement of a saturable reactor provided with a busy test winding by which a translating operation is prevented in case the line identified by this particular reactor is busy; and Fig. 6 is a schematic circuit arrangement for hunting over a P. B. X line group to locate an idle line.

*The prior art*

Since the arrangement of the present invention is a circuit device which may find use in a vast and complicated communications art circuit, certain prior art patents will be listed as examples of locations where the translator may be used.

Patent 2,105,921, issued to F. A. Korn on January 18, 1938, shows a "relay tree" by which a number such as a telephone directory number is translated into equipment numbers by means of which the physical location of such numbered line is determined and the line reached by a marker.

Patent 2,265,844, issued to F. A. Korn on December 9, 1941, shows a calling line identification circuit using banks of transformers in a connecting pattern bearing some resemblance to the present arrangement.

Patent 2,339,803, issued to L. M. Potts on January 25, 1944, shows a code translating arrangement for line identification based on the use of transformers which may have windings coupled in series in code relationship.

Patent 2,201,573, issued to Carpenter-Kittredge on May 21, 1940, shows a "relay tree" for translating a number in one system to a number in another system. In this patent, it is set forth that there is a set of terminals individual to each directory number and another set of terminals individual to each line appearance in the switching means employed, the relay tree being used in this case to translate from one to the other.

Patent 2,293,177, issued to A. M. Skellett on August 18, 1942, shows an electronic tube and suitable circuits in which it may be operated which may be used as detecting means responsive to a pulse created by one of the saturable reactors employed in the present arrangement.

Patent 2,183,147, issued to J. B. Moore et al. on December 12, 1939, shows a check circuit used to prove that three and three only pulses of an eight-place code have been received. While this discloses a check circuit in the form of a counting means, others means in the form of a circuit network for accomplishing the same result in various forms are known.

Patent 2,281,396, issued to E. L. Vibbard on April 28, 1942, shows a series of relays operated individually and sucessively to control sequential operation of other circuits.

*Detailed description*

Figure 1:
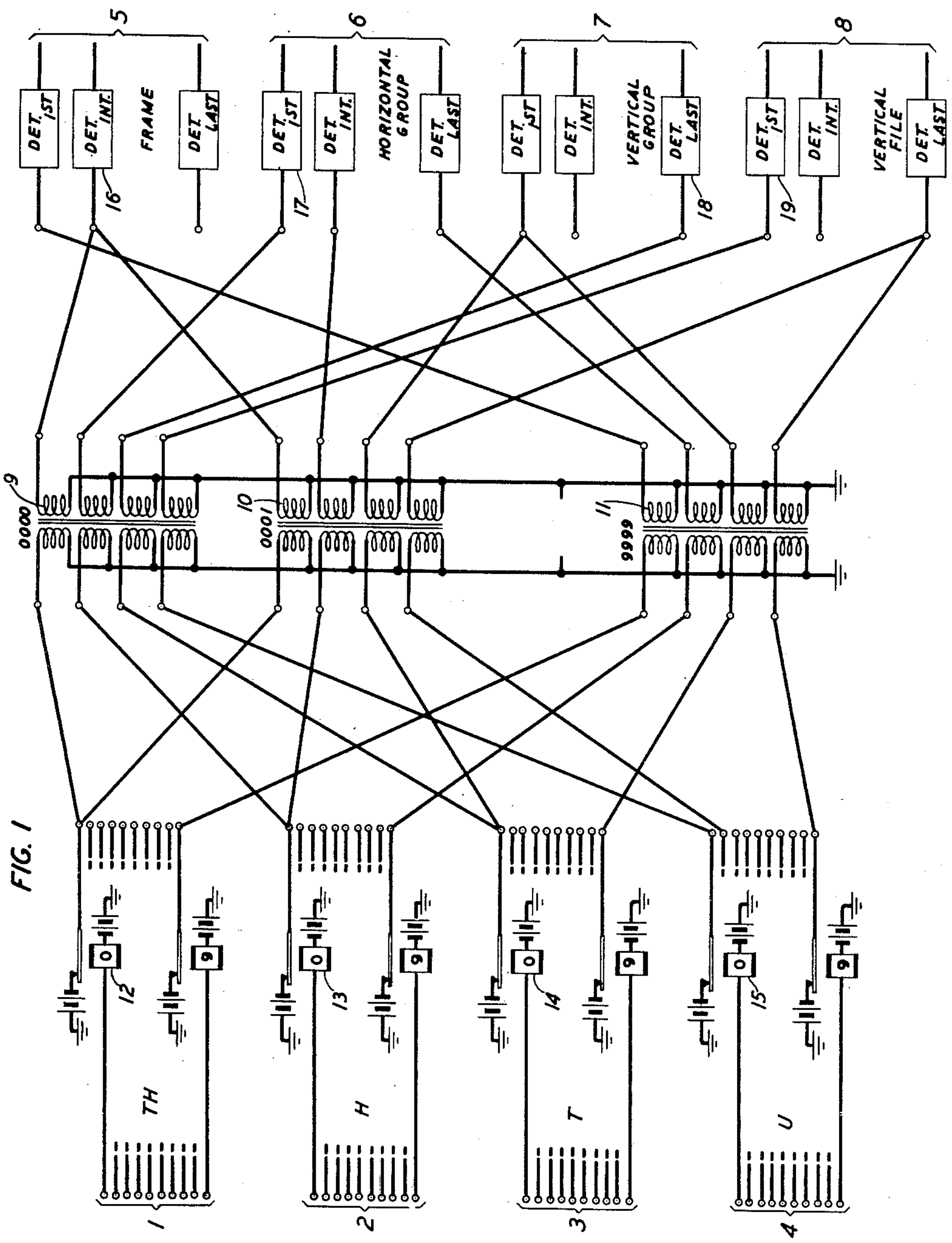
Fig. 1 is a schematic circuit diagram showing the essential elements of a translator employing the saturable reactor of the present invention.

In order to render the disclosure as clear as possible the translating means is shown cross-connected in Fig. 1 between incoming numbers and outgoing numbers. The incoming numbers are shown in four groups representing ten leads each for the thousands, hundreds, tens and units digits of numbers which may be directory numbers. These leads may be those selectable by the relays of a register in a register sender. In the outgoing end there are also four groups of leads designated frame, horizontal group, vertical group and vertical file. In one type of cross bar system the line appearances are wired to a plurality of frames. Each frame has a plurality of cross bar switches arranged in ten horizontal rows the number of switches in a row varying in accordance with a number of factors such, for instance, as the traffic density for the lines appearing in these particular switches. All the lines in the switches of any one horizontal row are said to belong to a given numbered horizontal group. Each group of lines, ten in number, in any one given vertical line is known as a vertical file and five vertical files consecutively arranged as verticals 0 to 4, or 5 to 9 in the switches form a vertical group. A vertical file thus invariably includes 10 lines, a vertical group 50 lines, a horizontal group 30 to 70 lines, a frame 300 to 700 lines and an office up to 40 frames and 10,000 lines. A line appearance location may then be fixed by the number of its frame, its horizontal group, its vertical group and its vertical file. The leads of group 5 designated "frame" are not necessarily ten in number but may, as indicated above, comprise 40 terminals each leading to one of the possible 40 frames which may be included in an office. In like manner, the leads in the groups 6, 7 and 8 leading to the horizontal groups, the vertical groups and the vertical files are not necessarily on a decimal basis. It is believed that this explanation coupled with the prior art arrangements above-noted will make the use of the translator or converter of the present invention clear.

The means of the present invention is provided for a translation device suitable for translating from directory number to equipment location in telecommunication or other similar systems. The means employed replaces the elaborate relay tree heretofore employed for selecting a code point and is capable of "two-way" translation. It includes means for "jump hunting" for an idle line in a P. B. X group with no restriction on the location of individual lines in the group The basic element is a saturable reactor or "kick-coil" having a plurality of windings. These elements will be provided on the basis of one-per-code combination or line number to be translated. When the translator is in use each reactor will have a number of windings energized by direct current, the current through a single winding being sufficient to saturate the core. The basic translator action is to remove the energizing current from certain windings on a group of reactors cross-connected in such a manner that a particular input code combination will permit current to flow through at least one winding of all reactors except the one representing that code combination.

This particular reactor having all energized windings deenergized will produce a voltage "kick" which will actuate gas or vacuum tube detectors appropriately cross-connected to a set of windings on the reactor designed for each output winding. The translation is indicated by the particular set of output detectors which are actuated.

In Fig. 1, three of these saturable reactors are shown. The reactor 9 is shown cross-connected to the points indicating a directory number 0000. In like manner, the reactor 10 is shown connected to the points representing the directory number 0001 and the reactor 11 is shown connected to the points representing the directory number 9999. It will be plain that other reactors may be cross-connected as to represent a particular directory number. In the present instance, it may be noted that each of the wires in the thousands group 1, the hundreds group 2, the tens group 3 and the units group 4 leads to a relay such as the relay 12. This relay through its armature and back contact supplies battery to the windings of a large number of reactors in parallel, each of which is connected at its other terminal to ground. Thus, each of the four left-hand windings of the coil 10 is supplied with direct current from the back contacts of relays 12, 13, 14 and 15 and if the directory number 0000 is indicated on the register relays of a register sender, then all four of these left-hand windings of the reactor 9 will be simultaneously deenergized, whereupon the deenergization of the magnetic circuit of this reactor will induce a kick in each of the four right-hand windings thereof which kick will be translated to various detectors in the groups of the frame, horizontal group, vertical group and vertical file. As indicated in Fig. 1, the reactor 9 is cross-connected on its output side to an intermediate numbered detector 16 in the group of frame leads, the first detector 17 in the group of horizontal leads, the last detector 18 in the group of vertical group leads and the first detector 19 in the group of vertical file leads. It will be understood how the pulses thus transmitted to these particular group leads will operate the apparatus for selecting the given number.

It may also be noted that if this directory number 0000 is selected as above described that the first three left-hand coils of the reactor 10 will be simultaneously deenergized but that the bottom left-hand coil thereof will remain energized since it is cross-connected to the armature of a relay operated over the No. 1 lead of the units group 4. The simultaneous deenergization of the three upper coils can have no effect on this reactor since the bottom left-hand coil maintains the reactor fully saturated. Therefore, no pulses are transmitted from the right-hand windings of this reactor and, therefore, no other line is selected by its location.

It may be noted that in this particular arrangement here illustrated that the armature of relay 12 will be cross-connected in parallel to the one-thousandth coils on 1000 separate reactors in a fully equipped 10,000-line office and that similar multiple connections are provided from each such point.

At the outgoing end of this converter similar parallel connections are made thereof. Since these groups of leads are not on a strictly decimal basis, the number of coils connected in parallel will vary.

Each of the outgoing coils of the saturable reactor is connected to a detector such as the detector 16, 17, 18 or 19. This detector may be in the form of a very sensitive relay, a gas or vacuum tube arrangement or any other type of sensitive electroresponsive means. The trigger tube disclosed in Patent 2,293,177, granted August 18, 1942, to A. M. Skellett would be suitable for this purpose.

In the above description it is said that when the battery connections to four input windings of a reactor are simultaneously opened that the outgoing pulses will be produced. It should be noted that the sequence in which the input windings are disconnected from their sources of battery is of no consequence, the last winding so disconnected being the one which produces the kick. It should also be noted that kicks will be produced in the input windings of the completely deenergized reactor which will be communicated to the input windings connected in parallel therewith. The problem of "back-ups" between reactors having windings connected to the same cross-connection terminals is eliminated since all reactors but the one which delivers the kicks are saturated and do not act as transformers to induce appreciable kicks in other output windings on the various reactors.

Obviously, the number of input and output windings on each reactor may be increased or decreased to conform with the number of elements in the input and output codes. The number of inputs and outputs need not be equal.

It has been noted above that each battery supply wire is connected in multiple to a large number of windings on other reactors. Each of these windings forms a shunt path to ground and since all of these other windings will be saturated they will have a low impedance. Therefore, the practical fabrication of such a reactor which is able to produce sufficient kick to operate a detector against the combined shunt of all parallel windings may become economically a burden.

Figure 2:
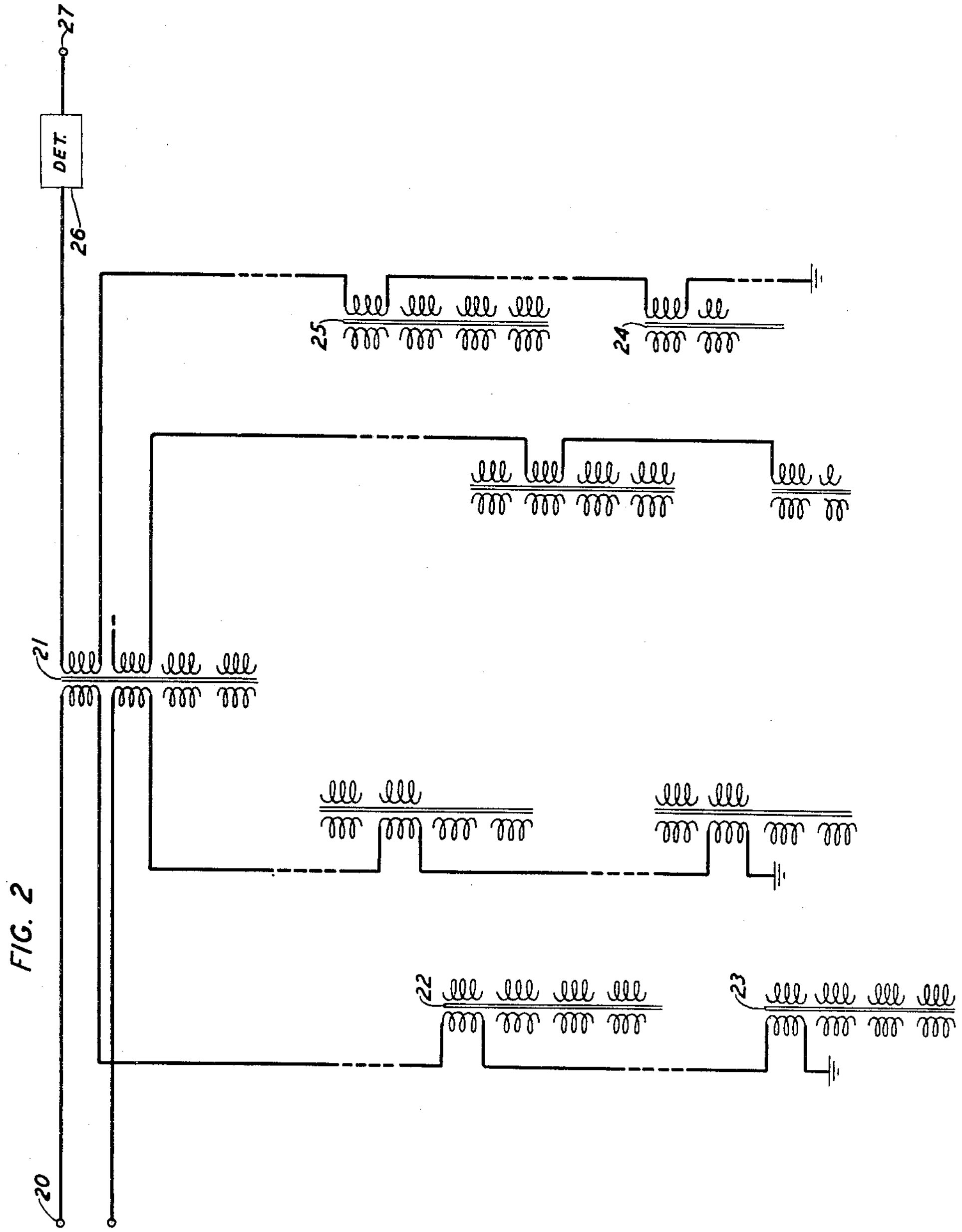
Fig. 2 is a schematic circuit diagram showing an alternative arrangement in which the separate coils of selected reactors are connected in series instead of in multiple as in the arrangement of Fig. 1.

This difficulty can be easily overcome by a series arrangement such as that indicated in Fig. 2. The solution is to connect all windings of a particular bus bar both input and output in series. Thus, the terminal 20 which may be connected to the armature of relay 12 will lead in series through windings of reactors 21, 22 and 23. In like manner, the ouput coils of reactors 24, 25 and 21 may be connected in series to a lead running through detector 26 to a frame conductor 27. Here, the low impedance of windings on saturated reactors aids the circuit action. Theoretically, this is a better arrangement even though twice as many connections must be made in connecting a reactor in circuit.

The original parallel arrangement will be shown in subsequent figures even though it will be understood that the alternative series arrangement is adaptable to any of the features described hereinafter.

Figure 3:
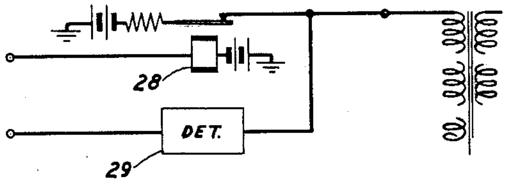
Fig. 3 is a fragmentary schematic circuit diagram showing a self-checking arrangement.

A self-checking feature which indicates that at least one reactor has its input windings connected according to the particular input code presented to the translator and that this reactor produces a kick is shown in Fig. 3. In this figure, the circuit arrangement to be used on each input bus bar is shown. This contains a control relay 28 and a detector 29 to be provided one per input terminal, the control relay functioning as previously described to remove battery from the bus bar. Now, since the unsaturated reactor kicks on all windings, both input and output, the detectors on the input leads will operate when the last winding of a selected reactor is deenergized. Thus, the operation of a detector associated with each grounded input lead indicates that a reactor is acting properly. Should a winding or a cross-connection on the selected reactor be open or short-circuited or the reactor otherwise disabled, one or more of the detectors will fail to operate. A conventional check that only one detector in each group of ten input leads operates will give a further indication that the proper information has been presented to the translator. It might be noted that the provision of detectors on only one set of ten input leads, say the units leads 4, will give an indication that a reactor acted but will not check such troubles as an open winding or cross-connecting lead. Again, let it be noted that in this arrangement as in others described, the sequence in which the input windings are disconnected from their sources of current is of no consequence. They may be opened simultaneously or in sequence. The opening of the last winding produces the kick which operates all detectors connected to the windings of that reactor.

Figure 4:
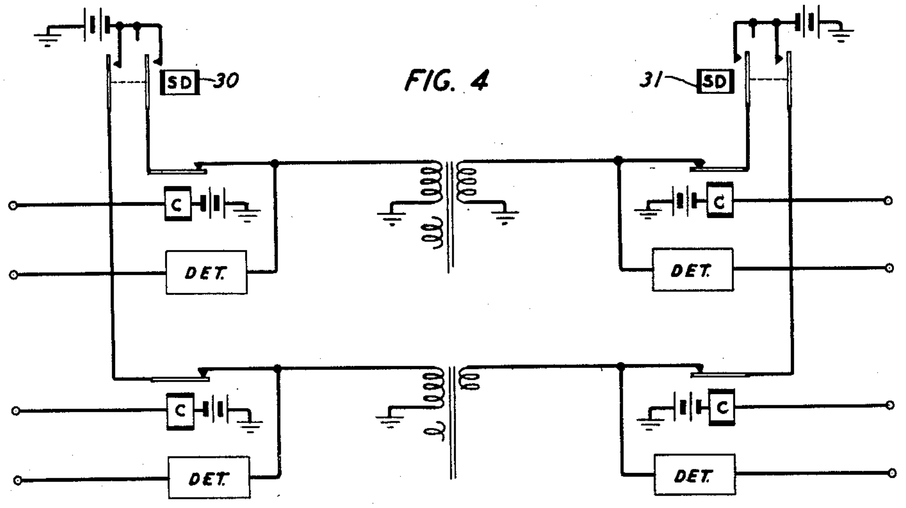
Fig. 4 is a schematic circuit diagram showing how the saturable reactor of the present invention may be connected into a two-way translating circuit.

For two-way operation the arrangement of Fig. 4 may be employed. A multicontact send relay 30 is provided having one make contact for each input terminal to connect battery to the cross-connection terminals. A similar relay 31 is provided on the output side. Only one of these relays will be operated at a time, this depending upon which side of the translator receives the information to be translated to the code of the opposite side.

Busy test of the line represented by the directory number can be made by equipping each reactor with a "busy indicating" winding connected to battery locally and to the sleeve lead of the line. Such a winding is shown as the winding 32 in Fig. 5. The winding 32 is indicated as being connected to the sleeve of the line indicated by the output terminals 33. When the line is busy ground on the sleeve lead causes current through the busy indicating winding which prevents the reactor from kicking. The failure to kick can be detected by failure of the check feature on the input leads or failure to receive output information. Since each busy indicating winding is in an individual circuit the difficulty encountered in the multiple connection arrangement of Fig. 1 is not encountered.

An arrangement for hunting over a P. B. X line group to locate an idle line is shown in Fig. 6. Each P. B. X group is provided with a "P. B. X start" reactor 34 and an "end-of-group" reactor 35, as well as one reactor per line in the group such as the reactor 36 for the first line in the group and the reactor 37 for the last line in the group. These all contain thousands, hundreds, tens and units coils cross-connected according to the P. B. X directory number so that when this number is presented to the translator the windings are opened or "uncovered" on all reactors in the P. B. X group. However, only the first reactor 34 or "P. B. X start" reactor for the group may be completely uncovered since the remaining reactors are saturated by one or more windings in the manner hereinafter described.

The P. B. X start reactor 34 is equipped with one or two windings in addition to the four directory number windings. One of these, winding 38, which is optional is a group busy winding which acts in the same manner as the individual line busy windings obtaining ground from a group busy lead from the P. B. X group if provided. This winding would function to dismiss the translator immediately if all lines are busy, acting in the same manner as for a busy individual line. The second winding 39 on the P. B. X start reactor is the "hunt-start" winding which will receive a kick if the directory number windings and group busy windings are uncovered. The kick from the hunt-start winding actuates a hunt-start detector 40 which is common to the entire translator. It is cross-connected to the hunt-start windings (in series or parallel) of all P. B. X start reactors in the translator. This detector starts a common circuit to hunt in sequence for an idle P. B. X line.

The hunting procedure is as follows. Each reactor for an individual P. B. X line is equipped with a busy indicating winding such as the winding 41 and a hunt winding such as the winding 42. All hunt windings are normally energized when the translator is in use and the busy indicating windings of all busy lines are energized. The action of the P. B. X hunt-start detector starts a sequence circuit 43 to automatically uncover in sequence and one at a time a number of cross-connection points equivalent to the largest number of P. B. X lines to be hunted over. These points are cross-connected to the hunt windings of all P. B. X lines. In the office such a connection is indicated by the wire 44 coming from the sequence circuit 43 to operate a relay 45 which in turn will, when energized, remove battery from the cross-connecting point 46 multipled to other P. B. X hunt windings in other P. B. X groups. Numbering the points in sequence, the first point is connected to the hunt winding of the first P. B. X line of every P. B. X group in the translator. The hunt windings of the second line in all P. B. X groups are connected to the second hunt group connection point, etc., the winding for the last or *n*th line in the group being connected to the *n*th hunt terminal.

With the above arrangement, the sequence circuit will uncover the hunt windings of reactors for each P. B. X line in the group in sequence. The reactors for busy lines will not kick since they are covered by the busy windings but when a reactor for an idle line is encountered it will be completely uncovered. The resulting kick will indicate on the output detectors the line location and will also halt the advance of the sequence circuit either by detectors on the hunt cross-connection terminals such as the detector 47 or by a common circuit which detects that output information has been received on the output detectors.

In the above arrangement since the sequence circuit 43 provides means for hunting over the largest P. B. X group in the translator it is desirable to have a means for stopping the hunting and indicating on a busy condition when the last line in a particular group has been tested and found busy. This may be done by an "end-of-group" reactor 35 provided for each group as shown in Fig. 6. This reactor contains the four directory number windings cross-connected with the corresponding windings of the other reactor of the group and contains two additional windings. One of these windings, 48, is the hunt winding which is connected to the hunt terminal following that of the last line in the group which is uncovered in sequence after the last line of the group is tested, that is, if the P. B. X group contains three lines the hunt winding 48 of this reactor is connected to the fourth hunt terminal. The last winding, 49, of the end-of-group reactor is connected with the corresponding winding of the end-of-group reactors of all P. B. X groups to a common end-of-group detector 50. Thus, when the end-of-group reactor is uncovered following the testing of the last line in the group, the end-of-group detector 50 will operate. This can both stop the P. B. X hunting and indicate an all-busy condition to the associated circuits.

By an extension of the above processes the translator could be arranged to hunt over large P. B. X line groups by hunting over subgroups until a subgroup is located having an idle line and then hunting over the individual lines of that group to locate the idle line.

If it is desired, individual lines in a P. B. X group may be located directly by providing a directory number for each line and an additional reactor for each line cross-connected according to directory number and line location. The particular line could then be located by the same method as a single individual line.

What is claimed is:

1. Means responsive to signals simultaneously transmitted over a selected given number of a plurality of incoming conductors for transmitting signals simultaneously over a selected given number of another plurality of outgoing conductors, consisting of a saturable reactor having a winding for each of said selected given number of incoming conductors and a winding for each of said selected given number of outgoing conductors, means for normally providing a current flow through said incoming conductor windings and means for signalling over said conductors, including means for stopping the said current flow in said associated windings, the said current flow in any one or more of said windings being sufficient to saturate said reactor whereby a pulse is produced in each said outgoing conductor upon the stoppage of current flow in all of said incoming conductor windings.

2. In a signalling system, a plurality of groups of identification conductors for identifying a particular entity through the selective characterization of one out of each said group of conductors in accordance with a first identification system, another similar plurality of groups of identification conductors arranged in accordance with a second identification system, a translator for each entity consisting of a saturable reactor having a winding connected to each of said selected conductors of said groups of said first plurality of identification conductors and a winding connected to each said selected conductor of said groups of said second plurality of identification conductors, a source of current connected to each of said first windings, the current flow in any one or more of said windings being sufficient to saturate said reactor, means for translating the identity of any of said entities consisting of means for simultaneously disconnecting said source of current from the corresponding first identification conductors to deenergize said individual reactor whereby a pulse is generated in the windings and transmitted over said second identification conductors.

3. In a signalling system, a plurality of groups of identification conductors for identifying a particular entity through the selective characterization of one out of each said group of conductors in accordance with a first identification system, another similar plurality of groups of identification conductors arranged in accordance with a second identification system, a translator for each entity consisting of a saturable reactor having a winding connected in parallel to each of said selected conductors of said groups of said first plurality of identification conductors and a winding connected in parallel to each said selected conductor of said groups of said second plurality of identification conductors, a source of current connected to each of said first windings, the current flow in any one or more of said windings being sufficient to saturate said reactor, means for translating the identity of any of said entities consisting of means for simultaneously disconnecting said source of current from the corresponding first identification conductors to deenergize said individual reactor whereby a pulse is generated in the windings and transmitted over said second identification conductors.

4. In a signalling system, a plurality of groups of identification conductors for identifying a particular entity through the selective characterization of one out of each said group of conductors in accordance with a first identification system, another similar plurality of groups of identification conductors arranged in accordance with a second identification system, a translator for each entity consisting of a saturable reactor having a winding connected in series to each of said selected conductors of said groups of said first plurality of identification conductors and a winding connected in series to each said selected conductor of said groups of said second plurality of identification conductors, a source of current connected to each of said first windings, the current flow in any one or more of said windings being sufficient to saturate said reactor, means for translating the identity of any of said entities consisting of means for simultaneously disconnecting said source of current from the corresponding first identification conductors to deenergize said individual reactor whereby a pulse is generated in the windings and transmitted over said second identification conductors.

WILLIAM KEISTER.

REFERENCES CITED

The following references are of record in the file of this patent:

UNITED STATES PATENTS

| Number | Name | Date |
|---|---|---|
| 2,021,099 | Fitzgerald | Nov. 12, 1935 |
| 2,129,920 | Fitzgerald | Sept. 13, 1938 |
| 2,139,079 | Haselton | Dec. 6, 1938 |
| 2,369,474 | Luhn | Feb. 12, 1945 |